(12) United States Patent
Lin et al.

(10) Patent No.: US 10,358,208 B2
(45) Date of Patent: Jul. 23, 2019

(54) HYBRID FLOW CONTROL METHOD FOR SIMPLE HINGED FLAP HIGH-LIFT SYSTEM

(71) Applicant: The United States of America as represented by the Administrator of the National Aeronautics and Space Administration, Washington, DC (US)

(72) Inventors: John C. Lin, Seaford, VA (US); Mehti Koklu, Hampton, VA (US)

(73) Assignee: THE UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 321 days.

(21) Appl. No.: 14/955,913

(22) Filed: Dec. 1, 2015

(65) Prior Publication Data
US 2016/0280358 A1   Sep. 29, 2016

Related U.S. Application Data

(60) Provisional application No. 62/085,678, filed on Dec. 1, 2014, provisional application No. 62/156,507, filed on May 4, 2015.

(51) Int. Cl.
*B64C 23/06* (2006.01)
*B64C 21/04* (2006.01)
(Continued)

(52) U.S. Cl.
CPC ............ *B64C 23/06* (2013.01); *B64C 3/50* (2013.01); *B64C 9/16* (2013.01); *B64C 21/04* (2013.01);
(Continued)

(58) Field of Classification Search
CPC ....... B64C 21/02; B64C 21/025; B64C 21/04; B64C 21/08; B64C 23/06; F15D 1/0025;
(Continued)

(56) References Cited

U.S. PATENT DOCUMENTS 4,447,028 A * 5/1984 Wang ................... B64C 9/00
244/207
4,508,267 A    4/1985 Stouffer
(Continued)

FOREIGN PATENT DOCUMENTS

FR    2555127 A2 * 5/1985 ............. B64C 23/06

OTHER PUBLICATIONS

Smith, A.M.O., "High-Lift Aerodynamics," Aircraft, 37th Wright Brothers Lecture, Jun. 1975, pp. 501-530, vol. 12, No. 6.
(Continued)

*Primary Examiner* — Richard R. Green
(74) *Attorney, Agent, or Firm* — Robin W. Edwards; Mark P. Dvorscak

(57) ABSTRACT

Systems, methods, and devices are provided that provide hybrid flow control for a simple hinged flap high-lift system using sweeping jet (SWJ) actuators for active flow control (AFC) and adaptive vortex generators (AVGs) that may be actuated by flap deflection for passive flow control (PFC). The various embodiments may significantly reduce mass flow, differential pressure, and power requirements for equivalent flow control performance when compared to using AFC only. The various embodiments may reduce the power requirement of AFC, while still maintaining the aerodynamic performance enhancement necessary for high-lift applications using a simple hinged flap. The various embodiments may provide the necessary lift enhancement for a simple hinged flap high-lift system, while keeping the pneumatic power requirement (mass flow and pressure) for
(Continued)

the AFC within an aircraft's capability for system integration.

20 Claims, 5 Drawing Sheets

(51) Int. Cl.
  *B64C 21/08* (2006.01)
  *B64C 9/16* (2006.01)
  *B64C 3/50* (2006.01)
(52) U.S. Cl.
  CPC .............. *B64C 21/08* (2013.01); *Y02T 50/14* (2013.01); *Y02T 50/162* (2013.01); *Y02T 50/166* (2013.01); *Y02T 50/32* (2013.01); *Y02T 50/44* (2013.01)
(58) Field of Classification Search
  CPC ........ F15D 1/003; F15D 1/0035; F15D 1/004; F15D 1/0045; F15D 1/005; F15D 1/0065; F15D 1/008; F15D 1/0095
  See application file for complete search history.

(56) References Cited

U.S. PATENT DOCUMENTS

| | | | | |
|---|---|---|---|---|
| 5,253,828 | A * | 10/1993 | Cox ..................... | B64C 23/06 244/200.1 |
| 8,382,043 | B1 * | 2/2013 | Raghu ................... | B64C 21/04 244/1 N |
| 9,505,485 | B2 * | 11/2016 | Dorsett .................. | B64C 23/06 |
| 2012/0091266 | A1 * | 4/2012 | Whalen .................. | B64C 23/06 244/87 |
| 2016/0052621 | A1 * | 2/2016 | Ireland .................. | B64C 21/04 137/13 |

OTHER PUBLICATIONS

Lin, John C., "Parametric Investigation of High-Lift Airfoil at High Reynolds Numbers," Journal of Aircraft, Jul.-Aug. 1997, pp. 485-491, vol. 34, No. 4.
Melton, Latunia P. et al., "High-Lift System for a Supercritical Airfoil: Simplified by Active Flow Control." 48th AIAA Aerospace sciences Meeting and Exhibit, Jan. 8-11, 2007, pp. 1-20.
Kiedaisch, John et al., "Active Flow Control Applied to High-Lift Airfoils Utilizing Simple Flaps," 3rd AIAA Flow Control Conference, Jun. 5-8, 2006, pp. 1-22.
Dodbele, S.S. et al., "Wind Tunnel Experiments and Nabier-Stokes Computations of a High-Lift Military Airfoil," AIAA 37th Aerospace Sciences Meeting and Exhibit, Jan. 11-14, 1999, pp. 1-15.
Luckring, J.M. et al., "Subsonic Reynolds Number Effects on a Diamond Wing Configuration (invited)," 39th AIAA Aerospace Sciences Meeting and Exhibit, Jan. 8-11, 2001, pp. 1-14.
McLean J.D. et al., "Study of the Application of Separation Control by Unsteady Excitation to Civil Transport Aircraft," NASA/CR-1999-209338, Jun. 1999, pp. 1-59.
Hartwich, Peter M. et al., "AFC-Enabled Simplified High-Lift System Integration Study," NASA/CR-2014-218521, Sep. 2014, pp. 1-31.
Gad-El-Hak, M., "Flow Control," Applied Mechanics Reviews, vol. 42, No. 9, 1989, pp. 261-293.
Bragg, M.B. et al., "Experimental Study of Airfoil Performance with Vortex Generators." J. Aircraft, May 1987, pp. 305-309, vol. 24, No. 5.
Lin, John C. et al., "Review of Research on Low-profile Vortex Generators to Control Boundary-layer Separation," Progress in Aerospace Sciences, 2002, pp. 389-420, vol. 38.
Ashill, P.R. et al., "Research at DERA on Sub Boundary Layer Vortex Generators (SBVGs)," 39th Aerospace Sciences Meeting and Exhibit, Jan. 8-11, 2001, pp. 1-11.
Lin, John C. et al., "Seperation Control on High-Lift Airfoils via Micro-Vortex Generators," Journal of Aircraft, Nov.-Dec. 1994, pp. 1317-1323, vol. 31, No. 6.
Greenblatt, David et al., "The Control of Flow Separation by Periodic Excitation," Progress in Aerospace Sciences, 2000, pp. 487-545, vol. 36.
Magill, John C., "Exploring the Feasibility of Pulsed Jet Separation Control for Aircraft Configurations," Journal of Aricraft, Jan.-Feb. 2001, pp. 4-.
Roth, J. Reece et al, "Electrohydrodynamic Flow Control with a Glow-Discharge Surface Plasma," AIAA Journal, Jul. 2000, pp. 1166-1172, vol. 38, No. 7.
Enloe, C.L. et al, "Mechanisms and Responses of a Single Dielectric Barrier Plasma Actuator: Geometric Effects," AIAA Journal, Mar. 2004, pp. 595-604, vol. 42, No. 3.
Glezer, A. et al., "Synthetic Jets" Annual Review of Fluid Mechanics, 2002, pp. 503-529, vol. 34.
Viets, Hermann, "Flip-Flop Jet Nozzel," AIAA Journal, Oct. 1975, pp. 1375-1379, vol. 13, No. 10.
Koklu, Mehti et al., "Sweeping Jet Actuator in a Quiescent Environment," Fluid Dynamics and Co-located Conferences, Jun. 24-27, 2013, pp. 1-21.
Raman, Ganesh, "Cavity Resonance Suppression Using Miniature Fluidic Oscillators," AIAA Journal—Technical Notes, Dec. 2004, pp. 2608-2611, vol. 42, No. 12.
DeSalvo, Michael et al., "Enhancement of High-Lift Airfoil Using Low-Power Fluidic Actuators," AIAA, 5th Flow Control Conference, Jun. 28-Jul. 1, 2010, pp. 1-15.
Seele, Roman et al., "Discrete Sweeping Jets as Tools for Improving the Performance of the V-22," Journal of Aircraft, Nov.-Dec. 2009, pp. 2098-2106, vol. 46, No. 6.
Phillips, Elisa et al., "The Dynamics of Separation Control on a Rapidly Actuated Flapp," 5th Flow Control Conference, Jun. 28-Jul. 1, 2010, pp. 1-16.
Seele, Roman et al., "Improving Rudder Effectiveness with Sweeping Jet Actuators," 6th AIAA Flow Control Conference, Jun. 25-28, 2012, pp. 1-12.
Seele, R. et al., "Performance Enhancement of Vertical Tail Model with Sweeping Ject Actuators," 5th AIAA Aerospace Sciences Meeting, Jan. 7-10, 2013, pp. 1-18.
Graff, E. et al., "Sweeping Jet Actuators—a New Design Tool for High Lift Generation," May 20-22, 2013, pp. 1-12.
Whalen, Edward A., "Performance Enhancement of a Full-Scale Vertical Tail Model Equipped with Active Flow Control," AIAA SciTech, 53rd AIAA Aerospace Sciences Meeting, Jan. 5-9, 2015, pp. 1-11.
Andino, Marlyn Y. et al., "Flow Separation Control on a Full-Scale Vertical Tail Model Using Sweeping Jet Actuators," AIAA SciTech, 53rd AIAA Aerospace Sciences Meeting, Jan. 5-9, 2015, pp. 1-14.
Koklu, Mehti et al., "Flow Separation Control Over a Ramp Using Sweeping Jet Actuators," AIAA Aviation, 7th AIAA Flow Control Conference, Jun. 16-20, 2014, pp. 1-5.

* cited by examiner

HYBRID FLOW CONTROL METHOD FOR SIMPLE HINGED FLAP HIGH-LIFT SYSTEM

CROSS-REFERENCE TO RELATED PATENT APPLICATIONS

This patent application claims the benefit of and priority to U.S. Provisional Patent Application No. 62/085,678 entitled "Hybrid Flow Control Method for Simple Hinged Flap High-Lift System" filed on Dec. 1, 2014 and U.S. Provisional Patent Application No. 62/156,507 entitled "Hybrid Flow Control Method for Simple Hinged Flap High-Lift System" filed on May 4, 2015. The entire contents of both applications are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

High-lift systems are designed to allow a transport aircraft—with typical transonic cruise speeds—to safely operate at low speeds for landing and takeoff operations. High-lift devices allow the use of a more efficient wing in flight, while adding more lift for takeoff and landing operations. These devices tend to re-shape the wing section to give it more camber, and therefore more lift. Current high-lift systems for low-speed flight conditions are complex systems in which cruise efficiency and acoustic performance are sacrificed during takeoff and landing operations.

Current high-lift systems are usually slotted both on the leading edge and the trailing edge of the wing to take advantage of the aerodynamic properties of slotted flows and to achieve the necessary high lift performance. The slotted leading and trailing edge devices, and the associated sub-systems necessary to change the wing configuration from cruise to low-speed conditions, are complex and employ a significant number of parts to enable safe operation. In addition, these complex mechanical high-lift systems (e.g., Fowler flap mechanisms) often protrude externally under the wings, and thus often require external fairings, that result in increased cruise drag.

In contrast to the complex mechanical high lift systems currently in use (e.g., Fowler flap mechanisms), simple hinged flaps are the simplest and most basic flaps for high-lift design. However, simple hinged flaps are currently not used in high-lift systems of transport aircraft because simple hinged flaps are vulnerable to flow separation at high flap deflections for both trailing edge and leading edge applications. Therefore, what is needed for transport aircraft, is a flow control method that enables a simple hinged flap system to achieve higher flap deflections without flow separation, and thereby achieve lift enhancement comparable to a complex conventional systems (e.g., Fowler-flap systems).

BRIEF SUMMARY OF THE INVENTION

The systems, methods, and devices of the various embodiments provide hybrid flow control for a hinged flap high-lift system using sweeping jet (SWJ) actuators for active flow control (AFC) and adaptive vortex generators (AVGs) that may be actuated by flap deflection for passive flow control (PFC). The various embodiment hybrid flow control systems, methods, and devices may significantly reduce mass flow, differential pressure, and power requirements for equivalent flow control performance when compared to using AFC only. The various embodiment hybrid flow control systems, methods, and devices may reduce the power requirement of AFC, while still maintaining the aerodynamic performance enhancement necessary for high-lift applications using a simple hinged flap. The various embodiment hybrid flow control systems, methods, and devices may provide the necessary lift enhancement for a simple hinged flap high-lift system, while keeping the pneumatic power requirement (mass flow and pressure) for the AFC within an aircraft's capability for system integration.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
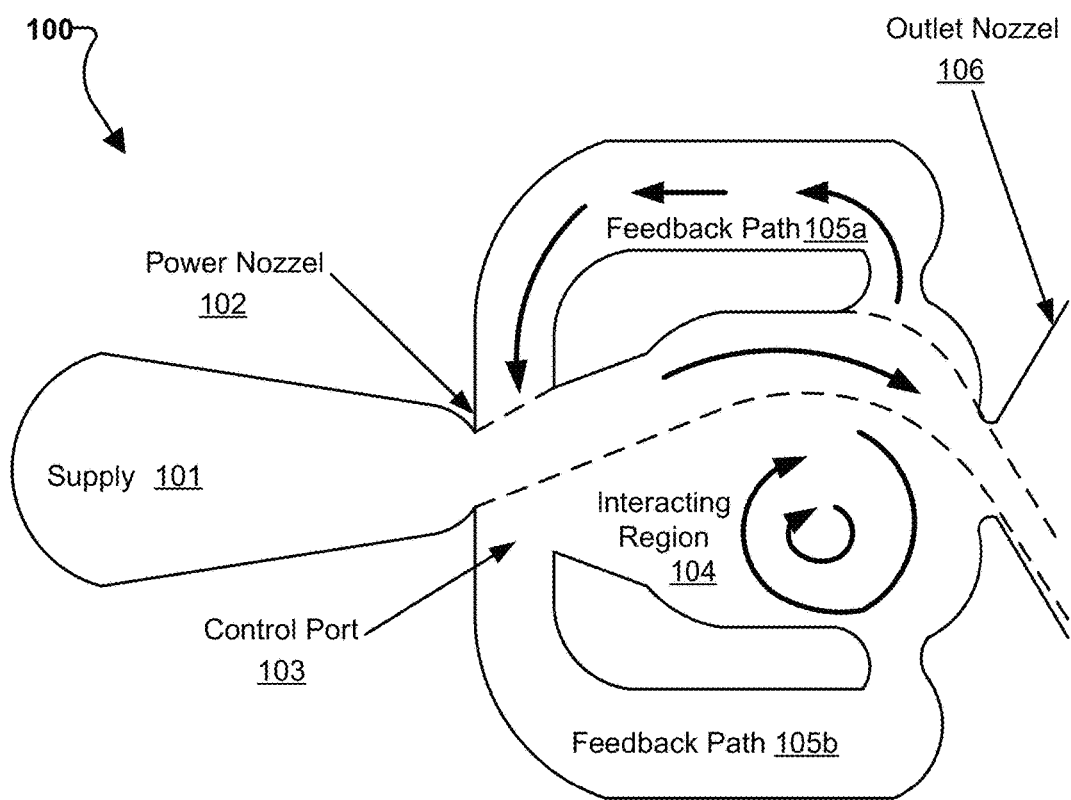
FIG. 1 is a schematic drawing of an example sweeping jet (SWJ) actuator suitable for use with the various embodiments.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various examples of different fluids are discussed herein, specifically air. The discussions of air are provided merely as examples to better illustrate aspects of the various embodiments, and are not intended to limit the claims to air unless specifically recited. Other fluids, such as other liquids (e.g., water) and other gases (e.g., nitrogen), may be used with the various embodiments, and other fluids may be substituted in the various examples discussed herein.

Flow control is the ability to actively or passively manipulate a flow field to a desired change and flow control has become a rapidly growing field in applied fluid dynamics because of its potential to dramatically improve system performance. Vortex generators (VGs) are passive flow control (PFC) devices. VGs are vane-like structures that are attached to an aircraft wing or other lifting surfaces or fuselages. The VGs (both conventional and low-profile types) have long been successfully used for flow separation control by increasing the near-wall momentum through enhanced momentum transfer from the outer part of the boundary layer to the near-wall region via streamwise vortices. Controlling the flow separation generally resulted in a significant aerodynamic performance improvement through increased lift and reduced drag. VGs do not require auxiliary power, but VGs have an associated parasitic drag penalty if not retracted during cruise flight operations. Concealable flap-actuated vortex generators (FAVGs) were designed for flow separation control on a simple hinged flap high-lift system without generating parasitic drag during cruise conditions. When the flap of the lifting surface (wing or airfoil) is in the non-deflected (cruise) position, the concealable FAVGs are unexposed and therefore do not produce any parasitic drag penalty. When the flap is deflected for high-lift application, the concealable FAVGs are designed to project or expose into an operational position to generate streamwise vortices for flow control. Example FAVGs are described in U.S. Pat. No. 5,253,828 which is incorporated herein by reference in its entirety.

Active flow control (AFC) implies energy addition to the flow field via an actuator to yield large-scale changes with minimal energy expenditure. Unsteady AFC has been shown to be more beneficial for an optimal performance than AFC, because unsteady AFC requires less energy input while satisfying output requirements. Unsteady AFC actuators may include: unsteady blowing, pulsed jets, plasma actuators, synthetic jets, fluidic nozzles, and fluidic oscillators. All of these unsteady actuation mechanisms have some strengths and weaknesses.

Fluidic oscillators are often referred to as sweeping jet (SWJ) actuators because they create oscillatory jets sweeping from side to side. The SWJ actuator may be a good AFC candidate because SWJ actuators have no moving parts, have a simple structure, are maintenance free, and have a compact design for easy embedment/installation. Additionally, SWJ actuators have functionality over a range of flow conditions, and applicability in any gas or liquid environment.

A schematic drawing of an example SWJ actuator 100 is shown in FIG. 1. The SWJ actuator 100 is similar to the SWJ described by G. Raman and S. Raghu in "Cavity Resonance Suppression Using Miniature Fluidic Oscillators," AIAA Journal, Vol. 42, No. 12, December 2004, which is incorporated herein by reference in its entirety. The SWJ actuator 100 emits a continuous jet that flips from one side of the outlet nozzle 106 to the other. The air passing through the entrance (or supply) nozzle 101 is compressed and funneled to the power nozzle 102 on the left of FIG. 1 from which the air flow attaches itself to one of the solid surfaces within the SWJ 100 (e.g., in the case shown in FIG. 1 the air flow is attached to the upper surface) due to the Coanda effect. The jet curves as it rushes to the outlet 106, thereby increasing the pressure at the inlet to the upper feedback channel or path 105a. The feedback channel or path 105a guides the recycled portion of the air flow back to the control port region 103 of the SWJ 100. This creates flow in the feedback channel or path 105a that pushes the entering jet back to the opposite surface and repeats the process with the other feedback channel or path 105b.

SWJ actuators were originally developed as logical functions (i.e., fluid amplifier) during the 1960s, and have recently been used as AFC devices. These actuators use a pressurized air source to produce spatially oscillating jets to improve aerodynamic performance for many AFC applications. For example, the performance of a single-element high-lift airfoil was increased substantially (up to a 66% increase in lift at 40° flap deflections) by employing a spanwise array of fluidic oscillators. Similarly, the SWJ actuators reduced the download force on a powered V-22 tilt-rotor model by almost 30% by eliminating the separation at large flap deflections. These actuators were shown to eliminate dynamic stall effects of an NACA 0021 airfoil at steady and unsteady flap deflections by a significant gain in lift and a substantial reduction in drag within a short period of time. The SWJ actuators have been wind tunnel tested on a subscale (~14%) model and a full-scale Boeing 757 vertical tail model, as well as successfully flight-tested on the vertical tail of a Boeing 757 ecoDemonstrator. Actuation was placed on the rudder and on the main element's trailing edge, and different actuator size and spacing effects of SWJ actuators have been tested on the spanwise flow over swept wings. These studies demonstrated significant side force enhancement of essentially equivalent to the lift enhancement of a tapered sweptback wing model with a simple flap system. Although the flow control performance of the SWJ actuators was compared to PFC devices (VGs) over a backward-facing ramp in testing and modeling, SWJ actuators and PFC devices (VGs or concealable FAVGs) have never been used together for practical applications.

One major drawback of the concealable FAVGs for simple hinged-flap high-lift applications is the requirement of high-momentum boundary-layer flows just upstream of these passive devices. However, due to the increasing adverse pressure gradient and boundary layer thickness that exists for high flap deflections, there is virtually no suction pressure increase just upstream of the flap-hinge location of a simple hinged flap high-lift system without the addition of AFC. This lack of a suction peak is a direct indication that no high-momentum boundary-layer flow exists for concealable FAVGs to redirect toward the wall for flow control; consequently, the VGs or concealable FAVGs are useless in this situation. For large flap deflections, the flow separation usually occurs at the flap shoulder and it has been known that the VGs do not work when placed within or too close to the separated flow region. Conversely, a slotted (e.g., Fowler) flap high-lift system provides sufficiently high suction pressures (or high-momentum boundary-layer flows) around the flap-leading edge to enable the low-profile (or micro) VGs to be effectively used in flow separation control, and thereby lift enhancement.

However, without a slot to provide a source of high momentum boundary-layer flow around the hinge region being available in simple hinged-flap high-lift systems, the concealable FAVGs need a source of high momentum flow. Thus, the various embodiment hybrid flow control systems, methods, and devices using FAVGs in combination with AFC provided by SWJ actuators, or any other effective steady AFC devices (e.g., blowing through a spanwise slot, blowing through spanwise discrete nozzles, etc.) or unsteady AFC devices (e.g., unsteady blowing, pulsed jets, plasma actuators, synthetic jets, fluidic nozzles, etc.), may provide the necessary solution in simple hinged flap systems that enables a simple hinged flap system to achieve higher flap deflections without flow separation, and thereby achieve lift enhancement comparable to a complex conventional system (e.g., Fowler-flap system).

A systems benefit study was recently performed on AFC-enabled simple hinged flap high-lift systems for modern civil transports. The key findings for a promising candidate from that study were: (1) estimated 750 lbs reduction in operating empty weight (OEW), (2) estimated cruise drag reduction of 3.3 counts (thru elimination of the external fairings for the Fowler flaps), and (3) estimated fuel savings of about 400 gals/flight. One major drawback of the AFC system for simple hinged flap high-lift applications is that it may require more power (mass flow and pressure) than what is available from an aircraft's engines during high-lift (take-off and landing) operations, especially when the engines are in the idling mode during landing. While the benefits of AFC are very encouraging, there is still a significant technology (performance) gap for the AFC power requirement per half-wing between the design solution using computational fluid dynamics (36 lbm/s at 80 psia) and available engine bleed air (8 lbm/s at 80 psia). More significantly, the available engine bleed air at idle power during landing is only 3 lbm/s at 30 psia. The current hybrid flow control approach of the various embodiments may close the technology gap for the AFC power requirement (i.e., significantly lower mass flow and pressure required) that enable a simplified high-lift system to realize its drag reduction benefit.

Therefore, any approach to reduce the power requirement of an AFC system is needed. The systems, methods, and devices of the various embodiments provide hybrid flow control for a hinged flap high-lift system using SWJ actuators for AFC and adaptive vortex generators (AVGs) that may be actuated by flap deflection for PFC that may close the technology gaps discussed above by reducing the pneumatic power requirement (mass flow and pressure) associated with the AFC system.

The systems, methods, and devices of the various embodiments provide hybrid flow control for a hinged flap high-lift system using sweeping jet (SWJ) actuators for active flow control (AFC) and adaptive vortex generators (AVGs) that may be actuated by flap deflection for passive flow control (PFC). Test results show that the various embodiment hybrid flow control systems, methods, and devices may significantly reduce mass flow, differential pressure, and power requirements (by factors of 2, 5, and 10, respectively) for equivalent flow control performance when compared to using AFC only. The various embodiment hybrid flow control systems, methods, and devices may reduce the power requirement of AFC, while still maintaining the aerodynamic performance enhancement necessary for high-lift applications using a simple hinged flap. By combining features of SWJ actuators and AVGs, the two types of flow control devices' respective strengths may be maximized and the respective shortcomings may be minimized and the various embodiment hybrid flow control systems, methods, and devices may provide the necessary lift enhancement for a simple hinged flap high-lift system, while keeping the pneumatic power requirement (mass flow and pressure) for the AFC within an aircraft's capability for system integration. Additionally, the significant reduction of AFC mass flow, pressure, and power requirements may also have the benefit of reducing the AFC-induced jet noise associated with high-speed flows exiting from the actuator nozzle. In addition, since both SWJ actuators and AVGs do not have any moving parts, the various embodiments may be basically maintenance free.

In various embodiments, a wing, such as a simple hinged flap wing, may include both one or more vortex generators (VGs), such as one or more flap-actuated vortex generators (FAVGs), one or more adaptive vortex generators (AVGs), or one or more of any other type passive flow control (PFC) type VG, as well as one or more active flow control (AFC) device, such as one or more sweeping jet (SWJ) actuators or one or more of any other type of AFC flow control device that is able to provide high-momentum boundary-layer flows. The one or more AFC device of the wing may be configured to provide high-momentum boundary-layer flows toward the one or more VG.

In various embodiments, a wing, such as a simple hinged flap wing, may include at least one VG, such as a concealable FAVG, on a leading edge of the flap of the wing and at least one AFC device, such as a SWJ actuator or any other effective steady AFC devices (e.g., blowing through a spanwise slot, blowing through spanwise discrete nozzles, etc.) or unsteady AFC devices (e.g., unsteady blowing, pulsed jets, plasma actuators, synthetic jets, fluidic nozzles, etc.), on a main element of the wing.

In various embodiments, a wing, such as a simple hinged flap wing, may include at least one VG, such as an AVG, on the main element of the wing and at least one AFC device, such as a SWJ actuator or any other effective steady AFC devices (e.g., blowing through a spanwise slot, blowing through spanwise discrete nozzles, etc.) or unsteady AFC devices (e.g., unsteady blowing, pulsed jets, plasma actuators, synthetic jets, fluidic nozzles, etc.), on the main element of the wing. In various embodiments, a wing, such as a simple hinged flap wing, may include at least one VG, such as an AVG, on the trailing edge of the main element of the wing and at least one AFC device, such as a SWJ actuator or any other effective steady AFC devices (e.g., blowing through a spanwise slot, blowing through spanwise discrete nozzles, etc.) or unsteady AFC devices (e.g., unsteady blowing, pulsed jets, plasma actuators, synthetic jets, fluidic nozzles, etc.), on upstream of the at least one VG on the main element of the wing. In other embodiments, the at least one AFC device, such as a SWJ actuator or any other effective steady AFC devices (e.g., blowing through a spanwise slot, blowing through spanwise discrete nozzles, etc.) or unsteady AFC devices (e.g., unsteady blowing, pulsed jets, plasma actuators, synthetic jets, fluidic nozzles, etc.), may be disposed downstream of the at least one VG, such as an AVG, on the main element of the wing and/or on the flap. In further embodiments, the at least one AFC device, such as a SWJ actuator or any other effective steady AFC devices (e.g., blowing through a spanwise slot, blowing through spanwise discrete nozzles, etc.) or unsteady AFC devices (e.g., unsteady blowing, pulsed jets, plasma actuators, synthetic jets, fluidic nozzles, etc.), may be disposed along the hinge line of the wing. In still further embodiments, AFC devices, such as SWJ actuators, may be disposed in/on the wing at combinations of positions that are upstream of the at least one VG, downstream of the at least one VG, and/or alternating side-by-side with VG along the hinge line of the wing.

In various embodiments, a wing may include at least one VG, such as an AVG, on a drooped leading edge or on a leading edge flap of the wing (e.g., in reverse direction as the trailing edge flap), and at least one AFC device, such as a SWJ actuator or any other effective steady AFC devices (e.g., blowing through a spanwise slot, blowing through spanwise discrete nozzles, etc.) or unsteady AFC devices (e.g., unsteady blowing, pulsed jets, plasma actuators, synthetic jets, fluidic nozzles, etc.), disposed in/on the wing so as to provide high-momentum boundary-layer flows toward at least one VG. For example, the AFC device may be mounted on the flap itself, or mounted on the main element so as to direct high-momentum flow toward the VG.

Figure 2:
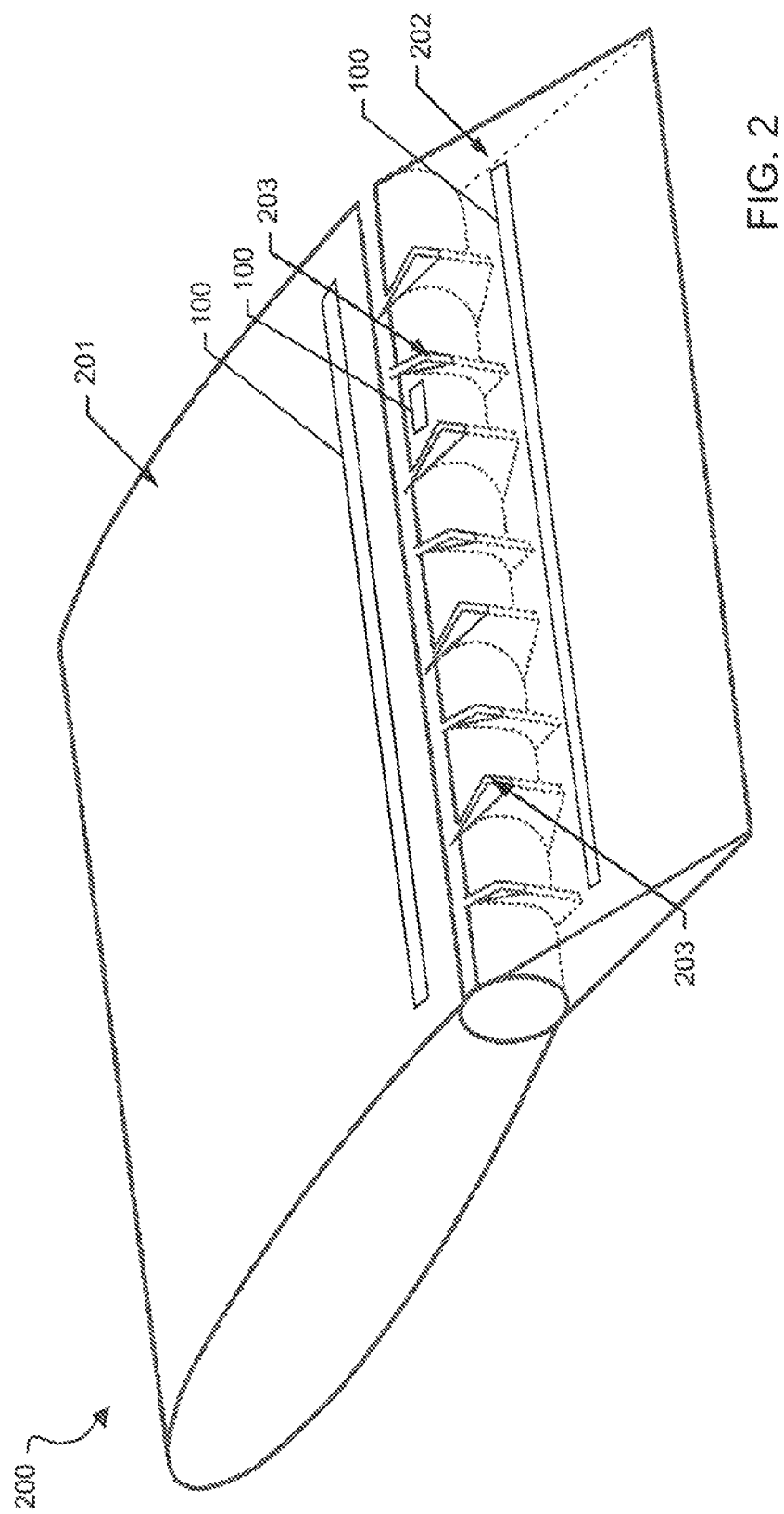
FIG. 2 is a schematic drawing of a simple hinged flap wing including adaptive vortex generators (AVGs) installed on the main wing element according to an embodiment.

A subtle, but beneficial feature in various embodiments, may be the introduction of AVGs with the VG vane installed/fixed on the main element's trailing edge as illustrated in FIG. 2. As opposed to other FAVGs installed on (or formed by) the flap's leading edge, as illustrated in FIG. 2, the wing 200 includes AVGs 203 installed/fixed/formed on the main element 201 of the wing 200. Thus, when the flap 202 deflects, the AVGs 203 are exposed. Additionally, FIG. 2 illustrates that the VG vanes of the embodiments AVGs 203 may be angled off center of the wing 200, for example in an alternating (counter-rotating) direction/pattern. In other embodiments, the AVGs 203 may be oriented in the same (co-rotating) direction/pattern or any combination of alternation and same direction/pattern. The installation/fixation/formation of the AVGs 203 on the trailing edge of the main element 201 may create a larger distance between any SWJ actuators included in the main element 201 and the AVGs 203 as opposed to the distance that would be created by FAVGs on the leading edge of the flap 202. This enables better system integration and gives SWJ actuators a more physical space upstream of AVGs to amplify their flow control effects (e.g., increase jet spreading, flow mixing, redirecting of higher momentum flow towards the wall, etc.). A second advantage of the installation/fixation/formation of the AVGs 203 on the trailing edge of the main element 201 as opposed to the leading edge of the flap 202, may be that installation/fixation/formation of the AVGs 203 on the trailing edge of the main element 201 does not generate a gap between the VGs and lifting surface. A gap between the VGs and lifting surface may not be a preferable feature, as it may forfeit the flow control benefit of the VGs and therefore require a gap-cover assembly. Thus, the installation/fixation/formation of the AVGs 203 on the trailing edge of the main element 201 does not require a gap-cover assembly. A third advantage of the installation/fixation/formation of the AVGs 203 on the trailing edge of the main element 201 as opposed to the leading edge of the flap 202, may be that by placing the VG vanes on the leading edge of the flap 202 generates backward-facing delta vane VGs, which may be a less efficient VG geometry than the installation/fixation/formation of the AVGs 203 on the trailing edge of the main element 201 that generates forward-facing delta vane VGs.

Figure 3A:
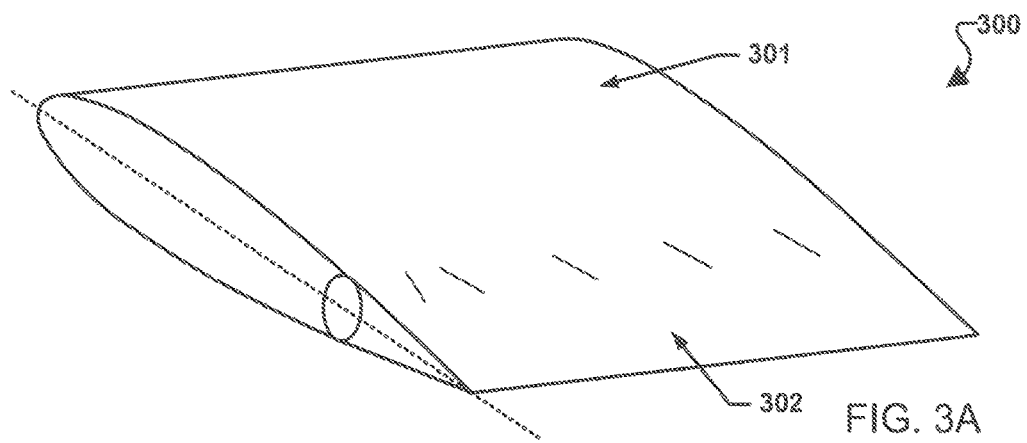
FIGS. 3A, 3B, and 3C are schematic drawings of a simple hinged flap wing including both SWJ actuators and AVGs according to an embodiment illustrated at different flap deflection levels.
Figure 3B:
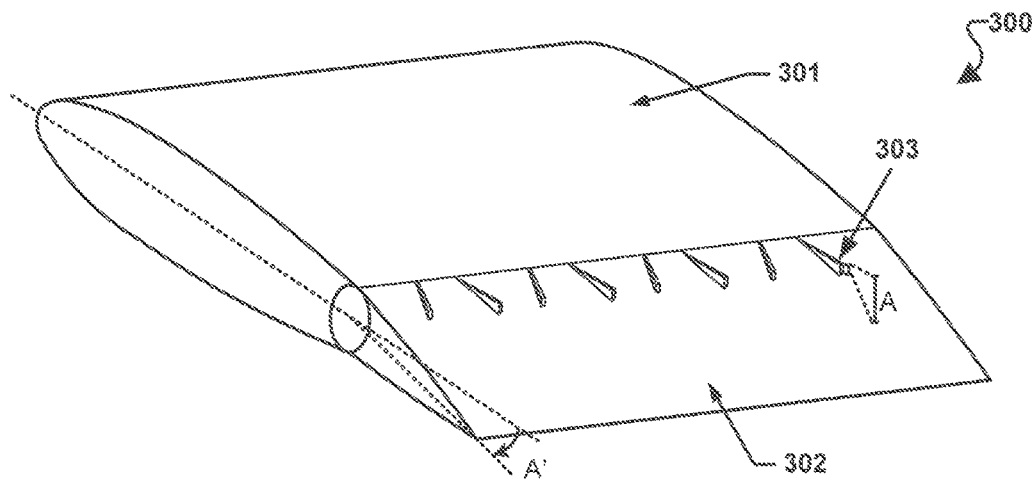
Figure 3C:
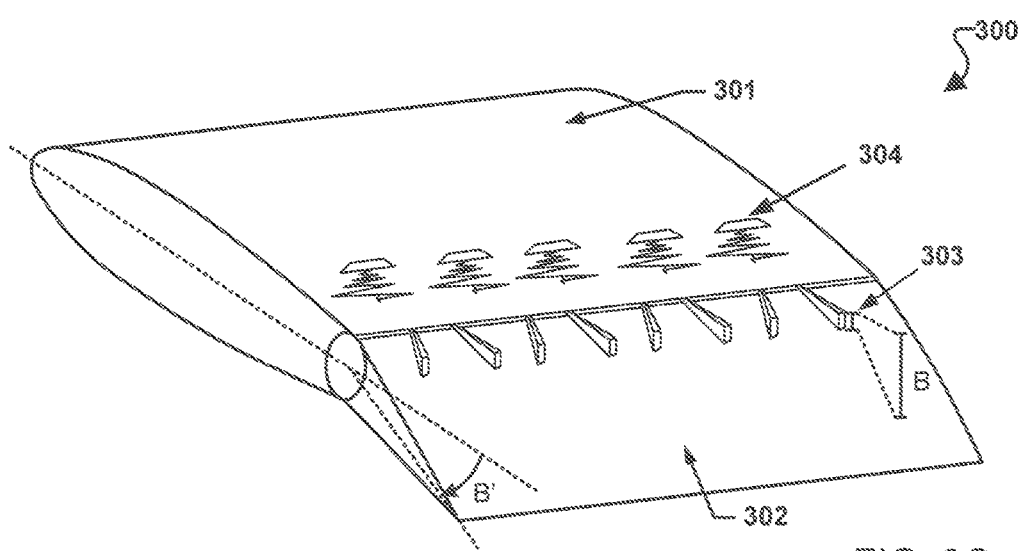

FIGS. 3A, 3B, and 3C are schematic drawings of a simple hinged flap wing 300 including both SWJ actuators 304 and AVGs 303 according to an embodiment illustrated at different flap deflection levels. Specifically, FIG. 3A illustrates the wing 300 with no flap deflection, FIG. 3B illustrates the wing 300 with a low flap deflection of an angle A', and FIG. 3C illustrates the wing 300 with a high flap deflection of an angle B' greater than angle A'. FIGS. 3A, 3B, and 3C illustrates how AVGs 303 and the SWJ actuators 304 may be used in combination for a simple hinged flap high-lift system wing 300. FIG. 3A shows the cruise configuration with no flap deflection and there is no flow control activation because the AVGs 303 are concealed entirely within the flap 302 and the SWJ actuators 304 are not activated. As the flap 302 is deflected to a low deflection angle A', only AVGs 303 are activated to prevent possible flow separation initiated from the trailing edge of the main element 301, as shown in FIG. 3B. Only a limited height A of the AVGs 303 is exposed in the low flap deflection state. As illustrated in FIG. 3C, for high-lift applications with a high flap deflection angle B (which is a larger angle than A') and a significant adverse pressure gradient, both SWJ actuators 304 and AVGs 303 may be activated for hybrid flow separation control. For example, The higher the flap deflection (i.e., the greater the deflection angle), the higher the vanes of AVGs 303 protrude from the flap 302 surface for more effective flow separation control, thus height B is greater than height A. In various embodiments, sensor(s) may be placed on the flap 302 to enable feedback control of the SWJ actuators 304.

In operation, the SWJ actuators 304 provide the high-momentum boundary-layer flow just upstream of the AVGs 303. The high-momentum flows pass through the AVGs 303 and then get redirected towards the wall, energizing the near-wall flow to prevent or delay flow separation.

The various embodiments combine an AFC device (e.g., SWJ actuators) and a PFC device (e.g., AVGs). Various embodiments are described with reference to SWJ actuators because SWJ actuators require relatively less mass flow compared to other AFC devices. However, SWJ actuators are merely an example of one type of AFC device suitable for use in the various embodiments. Other AFC devices, such as steady blowing, vortex generating jets, or any AFC device that is efficiently able to provide enough high-momentum boundary-layer flow for AVGs to redirect towards the wall for effective flow separation control, may be substituted in the various examples described herein.

Additionally, the AFC implementation of the various embodiments is not limited to just upstream of AVGs. The AFC device(s) may be installed downstream of the AVGs (e.g., on the flap surface). This configuration has merit because the AFC may be more effective when placed in close to the separated flow region. The downstream and upstream AFC device may even be used together with the AVGs, in alternating side-by-side with AVGs along the hinge line, or in any combination of aforementioned applications, to reduce the pneumatic power requirements (mass flow and pressure) for even higher flap deflections and more severe adverse pressure gradients. Specific examples of AFC device and AVG locations on embodiment wings may include: 1) the AFC device being located upstream of the AVG on a main element of the wing, and the AVG being located along a hinged line (e.g., just downstream) between a trailing-edge flap and the main element of the wing; 2) the AFC device being located downstream of the AVG on the main element of the wing, and the AVG being located along a hinged line (e.g., just downstream) between a drooped leading edge or a leading-edge flap and the main element of the wing; 3) the AFC device being located downstream of the AVG on a trailing-edge flap of the wing, and the AVG being located along a hinged line (e.g., just downstream) between the trailing-edge flap and the main element of the wing; 4) the AFC device being located upstream of the AVG on the main element of a drooped leading edge or leading-edge flap of the wing, and the AVG being located along the hinged line between a drooped leading edge or a leading-edge flap of the wing and the main element of the wing; 5) the AFC device being located in an alternating side-by-side pattern with the AVG along a hinge line between the main element and the trailing-edge flap of the wing; and 6) the AFC device being located in an alternating side-by-side pattern with the AVG along a hinge line between a drooped leading edge or a leading-edge flap of the wing and the main element of the wing. In any of these specific examples of AFC device and AVG locations on embodiment wings, the AFC device may be one or more of a SWJ actuator, a steady AFC device blowing through a spanwise slot, a steady AFC device blowing through a spanwise discrete nozzle, an unsteady blowing pulsed jet, an unsteady plasma actuator, an unsteady synthetic jet, and/or an unsteady fluidic nozzle.

Figure 4:
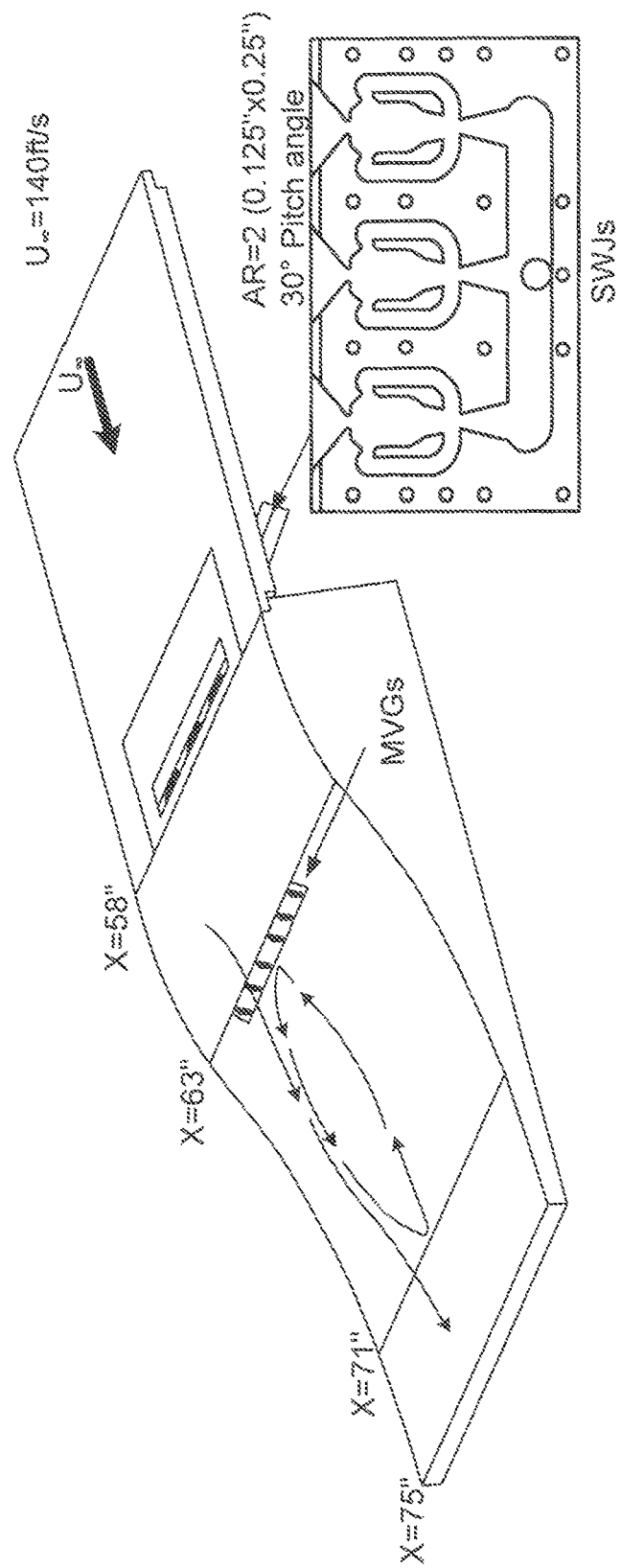
FIG. 4 is a schematic drawing of a hybrid flow control test setup according to an embodiment.
Figure 5:
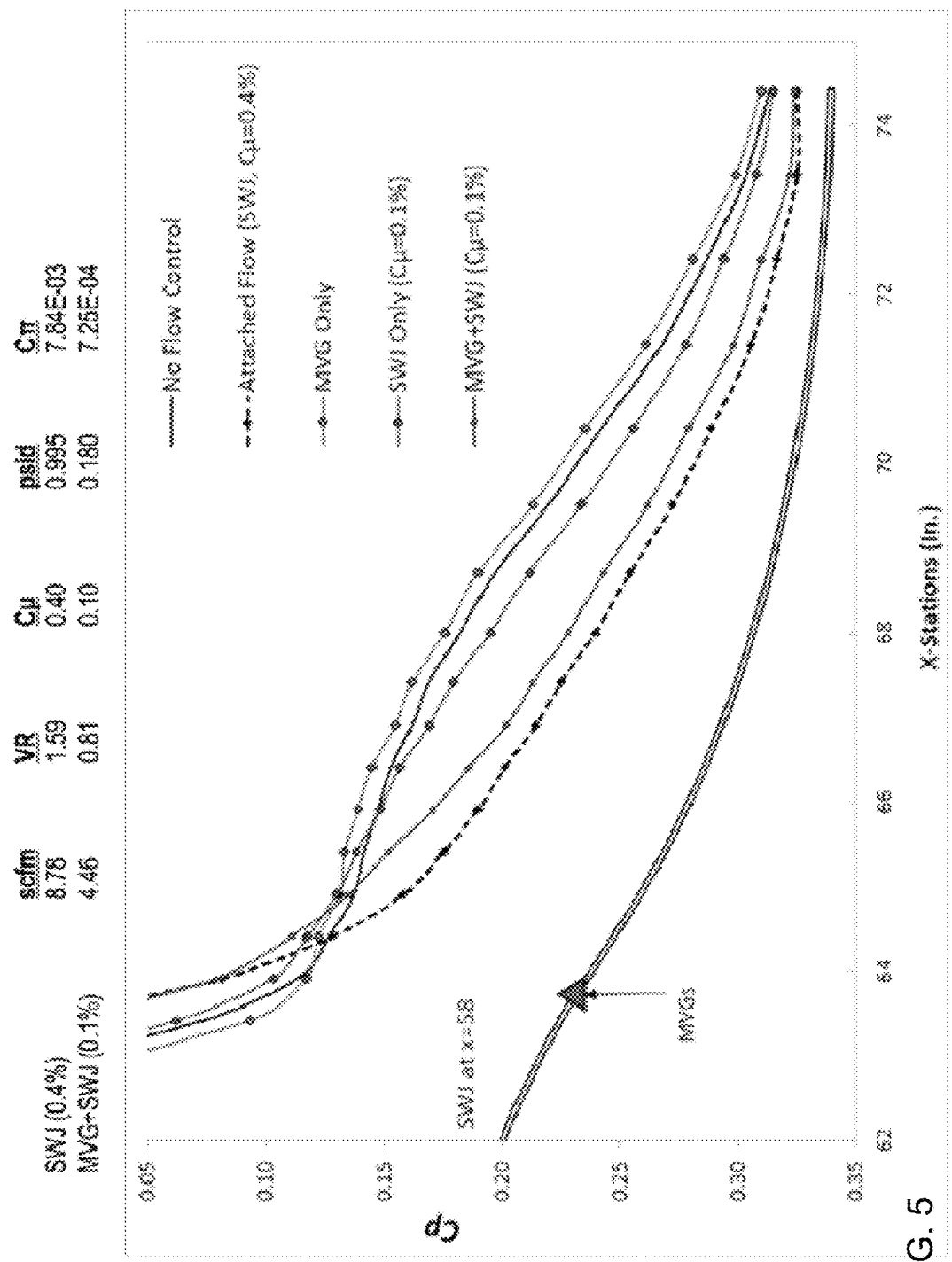
FIG. 5 is a graph of pressure distributions over a backward facing ramp with active flow control (AFC) and passive flow control (PFC) applications.

In order to verify the hybrid flow control concept employed by the various embodiments, an exploratory wind tunnel test on a backward-facing ramp was performed at a freestream speed of 140 ft/s. A schematic of the experimental set up is shown in FIG. 4. The backward-facing ramp emulated an adverse pressure gradient condition similar to that of a deflected flap on a simple hinged flap high-lift system. A row of vane-type micro VGs (or MVGs) emulated the AVGs as they were installed near the baseline separation line (x=63"). The MVGs were 0.2" in height and 0.75" in length, and they were oriented in the counter-rotating configuration at angles of ±23° to the onset flow. A row of 3 SWJ actuators was located upstream of the baseline separation line at x=58". The exit nozzle of the SWJ actuator was 0.125" in height and 0.25" in width. FIG. 5 shows the comparison of the surface pressure distributions for the following 5 cases: (1) no flow control (baseline), (2) attached flow achieved by SWJ with a momentum coefficient (Cµ) of 0.4%, (3) MVG only, (4) SWJ only (Cµ=0.1%), and (5) combining MVG and SWJ with Cµ=0.1%. The relevant AFC parameters such as mass flow (scfm), jet-to-freestream velocity ratio (VR), Cµ, plumbing differential pressure (psid), and power coefficient (Cπ) are shown at the top of FIG. 5. The data indicate that neither the "MVG only" nor the low mass flow "SWJ only" (Cµ=0.1%) made any significant improvement in pressure recovery compared to the baseline case. An improvement in pressure recovery is a good indication of flow separation control effectiveness. However, when combining the MVG and SWJ actuation together to leverage on each other's strengths, the resulting pressure recovery is just as good as the attached flow control case but with the mass flow reduced by a factor of 2, differential pressure reduced by a factor of 5, and power coefficient (Cπ) reduced by a factor of 10. The Cπ is linked to the power usage of an AFC system. In summary, the proof-of-concept test results showed that the hybrid AFC/PFC method of the various embodiments works very well. The initial test data indicated that the hybrid flow control of the various embodiments requires up to 50% less in mass flow, 80% less in differential pressure, and 90% less in power requirements for equivalent flow control performance when compared to the attached flow case with SWJ only. Thus, it was shown to be more effective than the steady blowing or vortex generating jets.

The various embodiments may have potential application for commercial transport aircraft, since the high-lift system is a critical part of the aircraft's design and system integration. Potential commercial applications include all hinged flap control surfaces (e.g., flaps and rudders) of commercial and military aircraft as well as marine vessels.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A wing, comprising:
    a main element with posing leading and trailing edges;
    at least one trailing-edge, flap movably attached to and deflectable from the main element proximate the trailing edge thereof;
    at least one passive flow control (PFC) device installed, fixed and/or formed on the main element at the trailing edge thereof; and
    at least one active flow control (AFC) device include on the main element and located upstream of the PFC device, the AFC device being configured to provide a high-momentum boundary-layer flow toward the PFC device.

2. The wing of claim 1, wherein the PFC device is a vortex generator (VG).

3. The wing of claim 2, wherein the VG is a flap-actuated vortex generator (FAVG) located at a leading edge of the flap.

4. The wing of claim 3, wherein the AFC device is a sweeping jet (SWJ) actuator.

5. The wing of claim 3, wherein the AFC device is selected from the group comprising a steady AFC device blowing through a spanwise slot, a steady AFC device blowing through a spanwise discrete nozzle, an unsteady blowing pulsed jet, an unsteady plasma actuator, an unsteady synthetic jet, and an unsteady fluidic nozzle.

6. The wing of claim 2, wherein the VG is an adaptive vortex generator (AVG).

7. The wing of claim 6, wherein the AFC device is located within the main element, and wherein the AVG is located along a hinged line between the trailing-edge gain and the main element.

8. The wing of claim 6, wherein the AFC device includes a first sweeping jet (SWJ) actuator located upstream of the AVG and a second SWJ actuator located downstream of the AVG.

9. The wing of claim 8, wherein the second SWJ actuator is located downstream of the AVG on the trailing-edge flap, and wherein the AVG is located along a hinged line between the trailing-edge flap and the main element.

10. The wing of claim 6, wherein the AFC device is located upstream of the AVG on a drooped leading edge or leading-edge flap, and wherein the AVG is located along the hinged line between the trailing-edge flap and the main element.

11. The wing of claim 6, wherein the AFC device is selected from the group comprising a sweeping jet (SWJ) actuator, a steady AFC device blowing through a spanwise slot, a steady AFC device blowing through a spanwise discrete nozzle, an unsteady blowing pulsed jet, an unsteady plasma actuator, an unsteady synthetic jet, and an unsteady fluidic nozzle.

12. The wing of claim 6, wherein:
    the AFC device is a plurality of SWJ actuators; and
    at least one of the plurality of SWJ actuators is located upstream of the AVG, at least one of the plurality of SWJ actuators is located downstream of the AVG, and at least one of the plurality of SWJ actuators is located at a hinge line side-by-side with the AVG.

13. The wing of claim 1, wherein the PTV device includes a vortex generator (VG) with a plurality of VG vanes spaced from one another spanwise along a span of the main element, the plurality of VG vanes being angled off center of the wing in a counter-rotating, pattern.

14. The wing of claim 1, wherein the PFC device includes a vortex generator (VG) with a plurality of VG vanes spaced from one another spanwise along a span of the main element, the plurality of VG vanes being angled off center of the wing in a co-rotating pattern.

15. The wing of claim 1, wherein the AFC device includes a sweeping jet (SWJ) actuator located within the main element, the SWJ actuator including a supply nozzle through which air enters and is compressed, an interacting region within which the compressed air curves, a feedback channel through which a recycled portion of the air is guided to a control region interposed between the supply nozzle and the interacting region, and an outlet nozzle through which air exits the SWI actuator in a jet that flips from one side of the outlet nozzle to the other.

16. A vehicle, comprising:
 a wing, comprising:
  a main element with opposing leading and trailing edges;
  at least one trailing-edge flap movably attached to and deflectable from the main element proximate the trailing edge thereof;
  at least one passive flow control (PFC) device installed, fixed and/or formed on the main element at the trailing edge thereof; and
  at least one active flow control (AFC) device included on the main element and located upstream of the PFC device, the AFC device being configured to provide a high-momentum boundary-layer flow toward the PFC device.

17. The vehicle of claim 16, wherein the PFC, device is a vortex generator (VG).

18. The vehicle of claim 17. wherein the VG is a flap-actuated vortex generator (FAVG) located at a leading edge of the flap.

19. The vehicle of claim 18, wherein the AFC device is selected from the group comprising a sweeping jet (SWJ) actuator, a steady AFC device blowing through a spanwise slot, a steady AFC device blowing through a spanwise discrete nozzle, an unsteady blowing pulsed jet, an unsteady plasma actuator, an unsteady synthetic jet, and an unsteady fluidic nozzle.

20. The vehicle of claim 19, wherein the VG is an adaptive vortex generator (AVG).

* * * * *